United States Patent
McKenzie-Kelly et al.

(10) Patent No.: US 12,361,061 B2
(45) Date of Patent: Jul. 15, 2025

(54) AUTOMATICALLY CREATING TASK CONTENT

(71) Applicant: International Business Machines Corporation, Armonk, NY (US)

(72) Inventors: Natasha Katherine McKenzie-Kelly, Salisbury (GB); Caroline Sarah Courtenay McNamara, Winchester (GB); Melita Saville, Winchester (GB); Clive Harris, Ropley (GB); Abigail Rose Bettle-Shaffer, Andover (GB); Timothy Andrew Moran, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 17/661,051

(22) Filed: Apr. 28, 2022

(65) Prior Publication Data
US 2023/0350947 A1    Nov. 2, 2023

(51) Int. Cl.
G06F 16/783    (2019.01)
G06F 3/16    (2006.01)
G06V 20/40    (2022.01)
G06V 20/62    (2022.01)

(52) U.S. Cl.
CPC .......... *G06F 16/7844* (2019.01); *G06F 3/167* (2013.01); *G06V 20/46* (2022.01); *G06V 20/635* (2022.01)

(58) Field of Classification Search
CPC ..... G06F 16/7844; G06F 3/167; G06V 20/46; G06V 20/635
See application file for complete search history.

(56) References Cited

U.S. PATENT DOCUMENTS 9,494,437 B2    11/2016    Subramanian
10,182,083 B2    1/2019    Cannon
(Continued)

FOREIGN PATENT DOCUMENTS

CN    111447479 A    7/2020

OTHER PUBLICATIONS

Apple, "Detecting Objects in Still Images", Apple Inc., Accessed Mar. 21, 2022, 8 Pages.
(Continued)

*Primary Examiner* — Fan S Tsang
*Assistant Examiner* — David Siegel
(74) *Attorney, Agent, or Firm* — Stephen R. Yoder

(57) ABSTRACT

A method, computer program product, and computer system are provided for automatically creating task content. The method includes receiving a video file with an associated transcript of audio associated with the video file and identifying task action terms in the transcript. For each task action term, the method includes: locating a visual section of the video file corresponding to the task action term; capturing at least a portion of the visual section of the video file; and using image recognition for identifying information relating to one or more interface elements that are being interacted with in the visual section. The method includes generating a task instruction document including the task action terms augmented with interface element information and with at least a portion of the captured visual section.

20 Claims, 7 Drawing Sheets

(56) References Cited

U.S. PATENT DOCUMENTS

| | | | |
|---|---|---|---|
| 2004/0153969 A1* | 8/2004 | Rhodes | G06F 16/38 715/209 |
| 2018/0349110 A1 | 12/2018 | Prasad Yellapragada | |
| 2020/0342369 A1* | 10/2020 | Sridhara | G06F 40/30 |
| 2023/0290146 A1* | 9/2023 | Chhaya | G06F 40/30 |

OTHER PUBLICATIONS

Github, "Textsearch", GitHub, Accessed Mar. 21, 2022, 13 Pages.
Google, "Get word timestamps", Google Cloud, Accessed Mar. 21, 2022, 5 Pages.
IBM, "Speech to Text docs", IBM Cloud, Jun. 9, 2021, 4 Pages.
Webster et al., "Automatically Extracting Procedural Knowledge from Instructional Texts using Natural Language Processing", Conference: In Proceedings of the Eight International Conference on Language Resources and Evaluation, May 2012, 9 Pages.
Wikipedia, "Edge detection", Wikipedia, Accessed Mar. 21, 2022, 11 Pages.
Mell et al., "The NIST Definition of Cloud Computing", Recommendations of the National Institute of Standards and Technology, NIST Special Publication 800-145, Sep. 2011, 7 pages.

* cited by examiner

AUTOMATICALLY CREATING TASK CONTENT

BACKGROUND

The present invention relates to task content documentation, and more specifically, to automatically creating task content.

Creating rich and clear task content for task topics is time consuming for developers. Task topics describe a series of actions that a user would carry out on a computer interface. The task content typically includes written instructions with images that illustrate the operational elements of the interface for some or all of the instructions. The use of both text and images significantly enhances the user experience. This is due to a user's personal preference for visual learning or text-based learning being accommodated and any ambiguity in written instructions being eliminated. The user is also able to validate the outcome of performing an instruction with what they see in the interface.

There are a number of steps that a content developer would take to undertake the writing of task content. Firstly, the actions a user would take are recorded. This is typically done by making notes during an interview with a subject matter expert or recording a demonstration from a subject matter expert. Secondly, corresponding images are captured from the user interface that illustrate the actions that a user takes. The actions and images are compiled into a structured format to make it possible to share the information with users.

The amount of time taken to write task topics including capturing the instructions and the corresponding images and ensuring that they are related accurately to each other is time-consuming and error-prone.

SUMMARY

According to an aspect of the present invention there is provided a computer-implemented method for automatically creating task content, said method carried out by one or more processors of a computer system and comprising: receiving a video file with an associated transcript of the audio associated with the video file; identifying task action terms in the transcript; for each task action term: locating a visual section of the video file corresponding to the task action term; capturing at least a portion of the visual section of the video file; and using image recognition for identifying information relating to one or more interface elements that are being interacted with in the visual section; and generating a task instruction document including the task action terms augmented with interface element information and with at least a portion of the captured visual section.

According to another aspect of the present invention there is provided a system for automatically creating task content, comprising: a processor and a memory configured to provide computer program instructions to the processor to execute the function of the components: a receiving component for receiving a video file with an associated transcript of the audio associated with the video file; a task term component for identifying task action terms in the transcript; for each task action term: a visual section component for locating a visual section of the video file corresponding to the task action term; a capturing component for capturing at least a portion of the visual section of the video file; and an image analysis component for using image recognition for identifying information relating to one or more interface elements that are being interacted with in the visual section; and a document generating component for generating a task instruction document including the task action terms augmented with interface element information and with at least a portion of the captured visual section.

According to a further aspect of the present invention there is provided a computer program product for automatically creating task content, the computer program product comprising a computer readable storage medium having program instructions embodied therewith, the program instructions executable by a processor to cause the processor to: receive a video file with an associated transcript of the audio associated with the video file; identify a task action terms in the transcript; for each task action term: locate a visual section of the video file corresponding to the task action term; capture at least a portion of the visual section of the video file; and use image recognition for identifying information relating to one or more interface elements that are being interacted with in the visual section; and generate a task instruction document including the task action terms augmented with interface element information and with at least a portion of the captured visual section.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for automatically creating task content. The described method receives a video file with an associated transcript and converts this into a task instruction document including task action terms augmented with interface element information and captured visual sections from the video file. In one example embodiment, the video file may be a computing user interface task instruction video with accompanying narration of instructions. The task action terms may be words, phrases, or sentences, and the captured visual sections may be still frames of the video file or video clips from the video file.

The described method analyzes the transcript to identify task action terms and to reconcile corresponding visual sections to enrich the generated task instruction document with the visual sections from the video file. The described method also verifies and disambiguates the text of the task action terms against interface elements shown in the video file.

The automated task content generation is an improvement in the technical field of computer media processing and technical instructional support for computer interaction.

Figure 1:
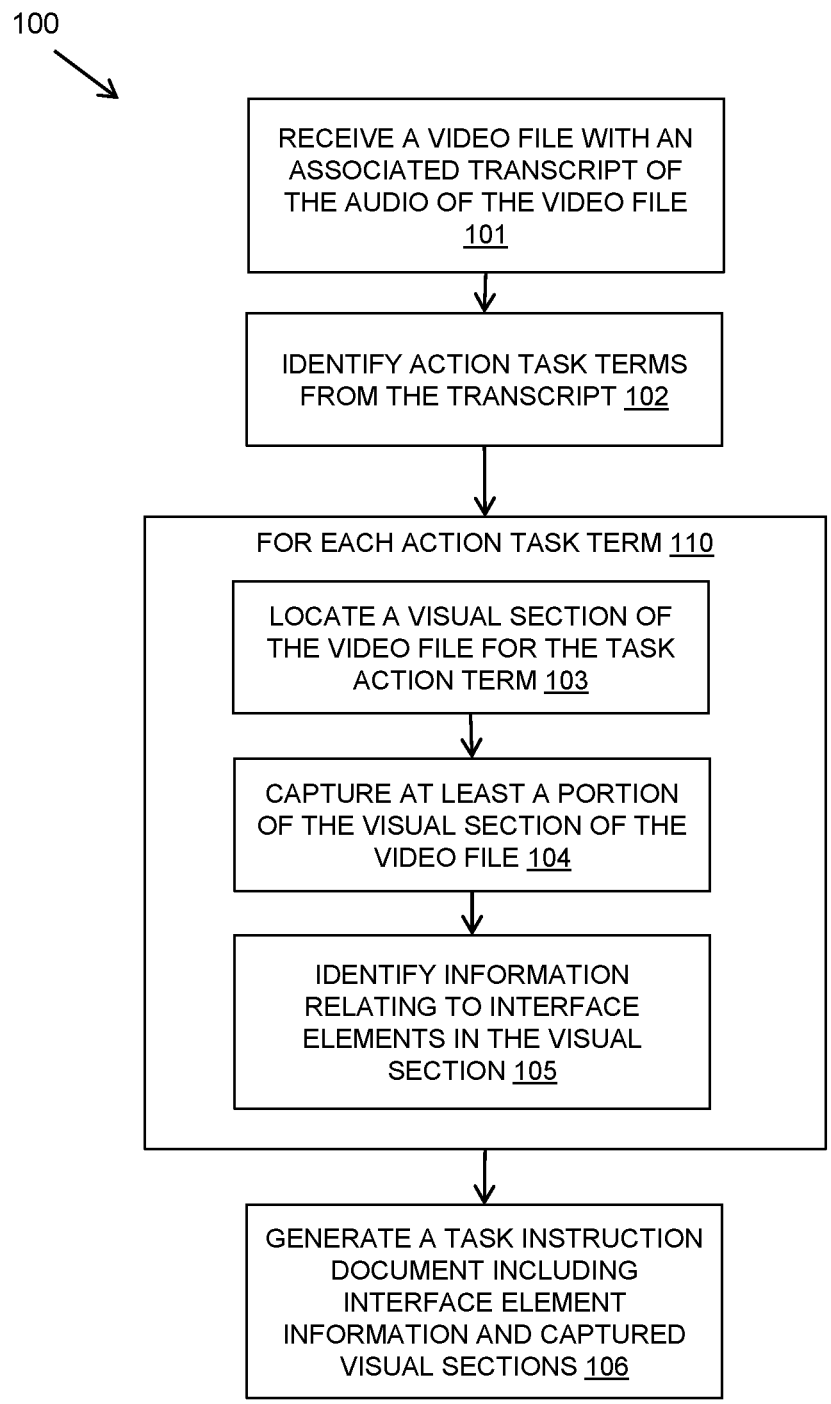
FIG. 1 is a flow diagram of an example embodiment of a method in accordance with embodiments of the present invention.

Referring to FIG. 1, a flow diagram 100 shows an example embodiment of the described method.

The method may receive 101 a video file with an associated transcript of the audio associated with the video file. The video file may be a computing user interface task instruction video with accompanying narration of instructions. The associated transcript may be generated by converting from speech in the video file to text using known conversion methods. The associated transcript may include timestamps corresponding to the audio of the video file.

The method may identify 102 task action terms in the transcript. Natural language processing (NLP) is used to locate terminology that is commonly used for explanations and instructions of task actions. Identifying the task action terms may be configured and improved through learning. For each identified task action term 110, the method may carry out steps 103, 104, and 105.

The method may locate 103 a visual section of the video file corresponding to the task action term. In one embodiment, locating a visual section of the video may be achieved by determining a timestamp of the identified task action term in the video file and locating a visual section of the video file corresponding to the timestamp. This may be for a timestamp instance or for a timestamp of a time range. In another embodiment, locating a visual section may involve visually analyzing the video file to identify visual elements matching the task action terms.

The method may capture 104 at least a portion of the visual section of the video file. The captured visual section may be a screenshot, a video frame, or a video clip or exert of the video file. Capturing the visual section may store a visual section from the video file in a repository and may provide a link to the visual section in the repository for use when generating the task instruction document.

The method may identify 105 information relating to one or more interface elements that are being interacted with in the visual section by using image recognition. This may include identifying or verifying interface elements in the visual section corresponding to the task action term by visual analysis. This may also include substituting ambiguous terms with terms derived from analysis of the visual section.

The method may generate 106 a task instruction document including the task action terms augmented with interface element information and with at least a portion of the captured visual section. The method extracts and enriches the transcript content with visual information from the video file to build an accurate documentation task topic. In one example, the task instruction document may be a Darwin Information Typing Architecture (DITA) document for authoring and organizing topic-oriented information.

Figure 2:
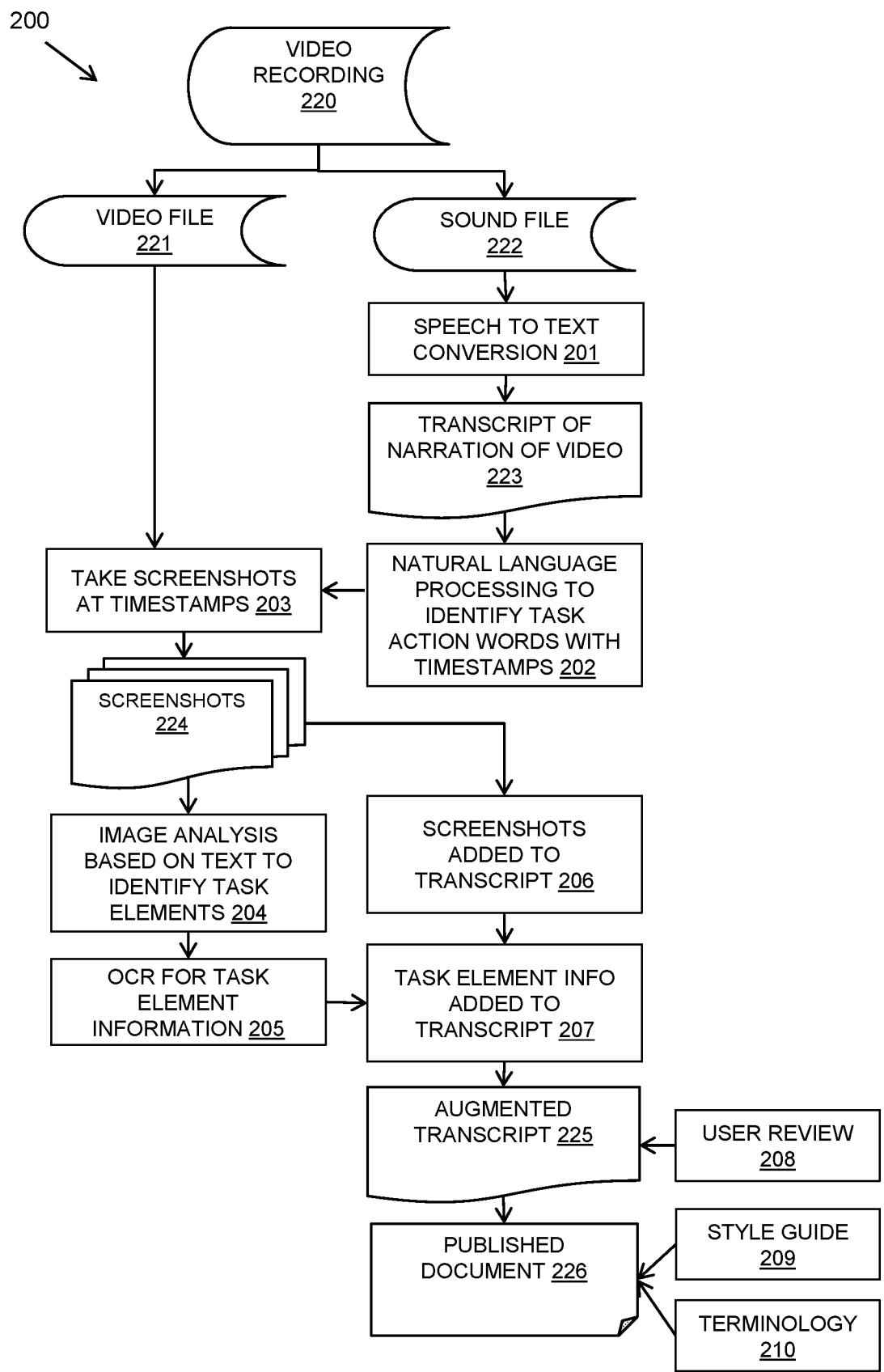
FIG. 2 is a schematic flow diagram illustrating an example embodiment of a method in accordance with the present invention.

Referring to FIG. 2, a schematic flow diagram 200 further illustrates an example embodiment of the described method. A video recording 220 is made of a narration of instructions relating to user interface interaction actions. The video recording 220 has a video file 221 including images of the user interface interaction and an associated sound file 222 of the narration.

The video recording 220 may be recorded with screen recording software into a video format. The narration may explain the user interface interaction actions with interface elements and may also provide context. The interface elements may include screens, windows, graphical user interface input components, etc. In one example, the video recording 220 may be a recorded demonstration. In another example, the video recording 220 may be recorded by two different people such as a tester who may record the actions and a subject matter expert who could provide the narrative. Video and sound files are saved and stored.

In the described method, the sound file 222 undergoes a speech-to-text conversion 201 to obtain a transcript 223 of the narration. This may be carried out using existing speech-to-text converters. Timestamps are added to the transcript 223 corresponding to the video file 221, for example, for each word in the transcript 223.

NLP 202 may be is used to distinguish the actions, or steps, within the transcript and to identify elements of the interface that are used for those actions. The NLP may identify task action terms or references to actions. For example, this may identify terms such as instructions of "click on", "navigate to", "open" and sequencing words like "now", "next", "then", "before", and/or image references such as "here", "as you can see", "shown", etc.

When a task action term is identified in the transcript, a screenshot or frame 224 from the video file 221 at the corresponding timestamp is captured 203 and added 206 to the narrative text. Screenshots 224 are therefore added 206 where certain words are detected that indicate a reference to or an instruction of an action.

A code component may run over the text file of the transcript 223, and each time the code component finds a word, the code component looks at the timestamp and finds the time in the video file 221. The frame from the video file 221 at the timestamp may be stored as an image in a repository. In the text file of the transcript 223, a link may be inserted to reference the image file in the repository, for example, <img href=screenshot1.jpg/>. When the document is published in a structured format at the end of the method, the image may be built into the document to be shown as an image.

Image analysis 204 may be used to distinguish and identify interface elements in the screenshots. Optical character recognition 205 of the analyzed image may obtain interface element information such as window names, labels, or text contained in an interface element. Task element information may be added 207 to the transcript. For example, the obtained interface element information may provide names for the elements that the actions are carried out on. The obtained interface element information may also be used to disambiguate what the narrator is saying by substituting a term from the image that has been captured instead of a transcribed term. Additional inputs may be made at this stage including a user review 208.

This results in an augmented transcript 225 with the screenshots and the task element information. The augmented transcript 225 may be converted to the chosen format for publication to a published document 226, for example, a DITA document. For example, this may be a document that is broken into a set of steps with markup and validated requirements. Style guides 209 and terminology 210 may also be applied to the published document 226.

Figure 3:
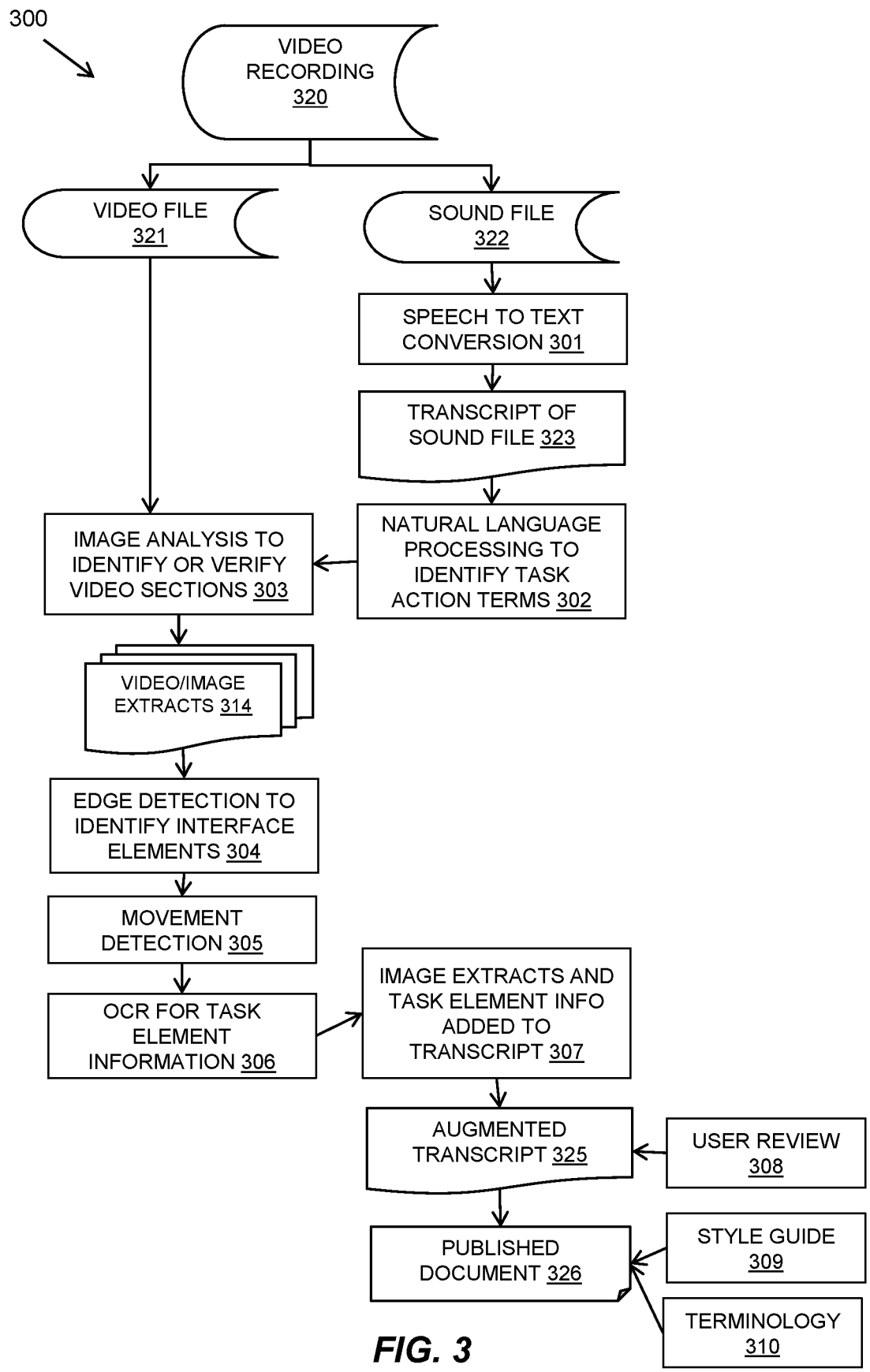
FIG. 3 is a schematic flow diagram illustrating another example embodiment of a method in accordance with the present invention.

Referring to FIG. 3, a schematic flow diagram 300 further illustrates another example embodiment of the described method. The steps of the method shown in FIG. 2 and FIG. 3 may be combined into an overall process.

A video recording 320 is made of a narration of instructions relating to user interface interaction actions having a video file 321 including images of the user interface interaction and an associated sound file 322 of the narration, as in FIG. 2.

The sound file 322 undergoes a speech-to-text conversion 301 to obtain a transcript 323 of the narration. This may be carried out using existing speech-to-text converters. Timestamps may be added to the transcript 323 corresponding to the video file 321. Natural language processing (NLP) 302 may be is used to distinguish the actions, or steps, within the transcript and to identify elements of the interface that are used for those actions.

In the case where the video recording 320 does not encompass both the interface and narrative elements simultaneously and therefore timestamps are not available, then the images file 321 may be visually analyzed 303 to identify the interface elements corresponding to the task action term. Matching may be carried out between the interface elements identified in the narrative and the elements identified in the video recording 320 to know which interface elements to extract into the text.

In the case where the identified 302 task action terms have a time range, the image analysis 303 may be used to verify the video sections of the time range to ensure that the correct interface element is captured.

In one embodiment, for each command-type sentence, a code component may run over the text file between the timestamps at the start of the command and the timestamp at the end. The segment between the timestamps may be fetched from the video file 321 for analysis.

This may result in video and/or image extracts 314 being obtained and stored for further analysis. Processing may be carried out on video extracts and any memory/storage that is used for this would be temporary.

Further image analysis may include using edge detection 304 to identify rectangles of a screen that may be interface elements. Edge detection 304 may include mathematical methods to identify edges in a digital image using discontinuities to determine rectangles. Edge detection may be used to determine what is open on the screen (for example, windows or boxes).

The analysis may also include movement detection 305 of where the mouse pointer is or where typing is happening indicating an interface element to which an action is being applied. Once the rectangles on the screen are identified, movement detection 305 may be used to determine the focus on the screen. Motion detection may be used to work out what is moving on the screen, in particular a mouse cursor, typing, and text input. Any changes in the detected rectangles may also suggest windows opening and closing. To detect the differences in movement a machine learning may be used. For example, to detect a difference between a mouse cursor or typing compared to a loading bar. Machine learning may be fed image possibilities for learning, for example, of changes in shape of elements.

Once the location of the movement is detected, the interface element it relates to may be recorded in the temporary storage. Optical character recognition (OCR) may be used 306 to detect text and deduce the element name or text content. OCR works by analyzing an image and extracting text from top to bottom and left to right. In most cases, a window name may be the first word to appear.

To disambiguate what the narrator is saying in the transcript, the movement detection and OCR may be combined. For example, the narrator may say 'click here' but he/she really means 'click on applications'. The method may detect the mouse movement then a change of background to the image of the mouse. OCR may be used to detect what text was in that area that became hidden by the mouse just before the background changed.

In a similar way, if no text is detected by OCR, it may be assumed that the interface element is a button or other non-text element and the image may be stored in the repository to use to describe the button. For example, the narrator says 'press pause' and the background may change from a pause button to a play button with a cropped screenshot of the pause button. This would then be stored in the repository and an <img href=image.jpg/> added in the text file. Ambiguous words may be substituted with the word of image that is on the screen.

Video or image extracts 314 and task element information and disambiguation 307 are added to the transcript text to result in an augmented transcript 325. User review 308 may be carried out on the augmented transcript 325. The augmented transcript 325 may be converted to the chosen format for publication to a published document 326, for example, a DITA document. Style guides 309 and terminology 310 may be applied to the published document 326.

The described method combines the output of a screen recording of the operation of an interface to accomplish a task and voice narration of the instructions to accomplish a task into a documentation task topic content. The actions of a user are broken down into a set of steps that would are written as an output with markup that may be validated against organizational style requirements. This saves content developers time and also ensures that task topics are more accurate.

Documented procedures are required by most organizations as part of their conformance to legislative requirements, such as health and safety, or to standards indicating organizational control, such as ISO9000. This method allows for the creation and maintenance of these procedures without requiring dedicated content developers.

Figure 4:
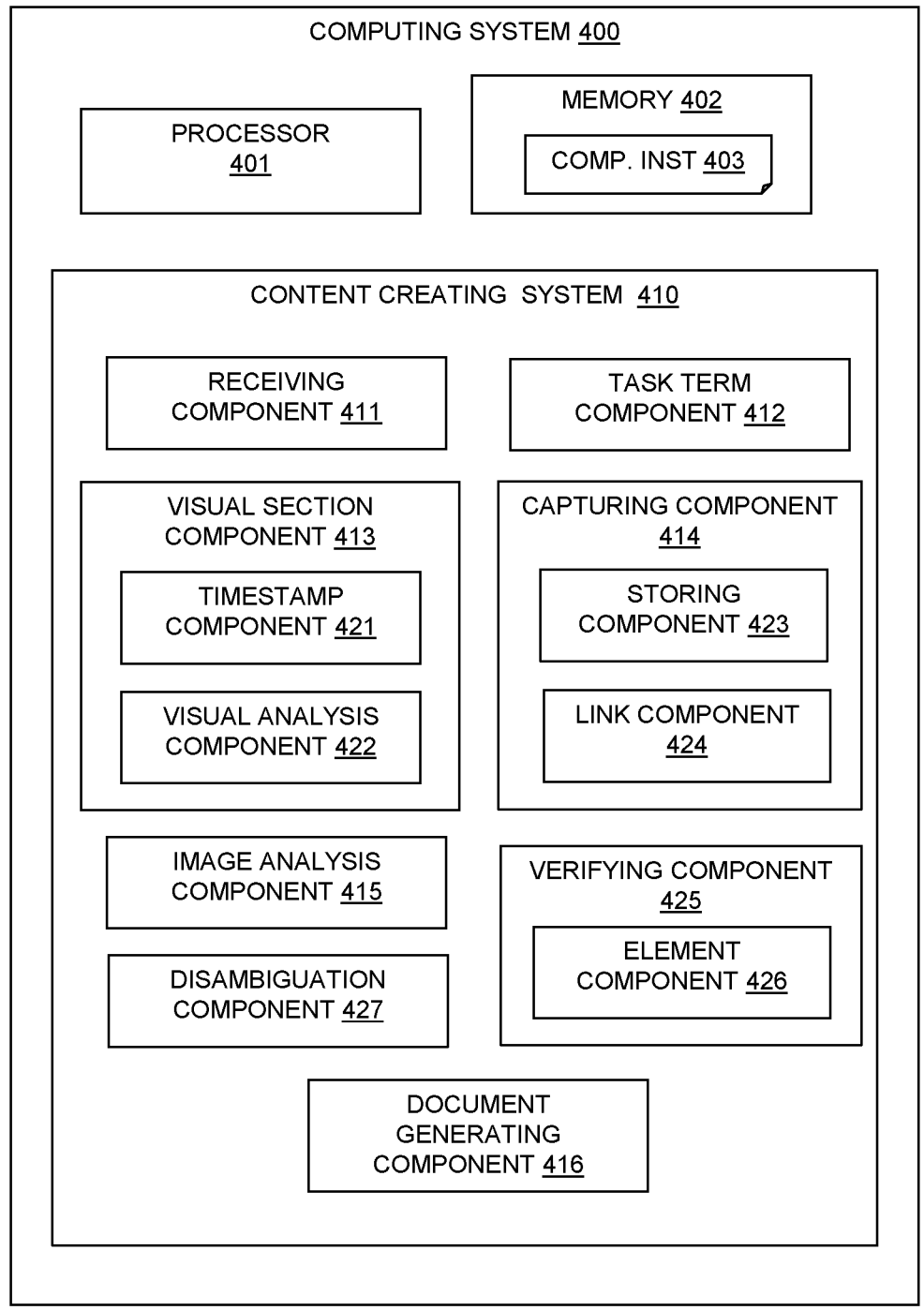
FIG. 4 is a block diagram of an example embodiment of a system in accordance with embodiments of the present invention.

Referring to FIG. 4, a block diagram shows an example embodiment of a computing system 400 in which the described system may be implemented.

The computing system 400 may include at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

A content creating system 410 is provided for automatically creating task content including a receiving component 411 for receiving a video file with an associated transcript of the audio associated with the video file. The content creating system 410 includes a task term component 412 for identifying task action terms in the transcript using NLP.

The content creating system 410 includes a visual section component 413 for locating a visual section of the video file corresponding to a task action term and a capturing component 414 for capturing at least a portion of the visual section of the video file.

The visual section component 413 may include a timestamp component 421 for determining a timestamp of the identified task action term in the video file and locating a visual section of the video file corresponding to the timestamp. The timestamp may be a time instance or a time range.

The visual section component may include a visual analysis component 422 for visually analyzing the video file to identify visual elements matching the task action terms. This may be used when a timestamp is not available or where the timestamp provides a range including multiple visual elements.

The capturing component 414 may include a storing component 423 for storing a visual section from the video file in a repository and a link component 424 for providing a link in the transcript to the visual section in the repository.

The content creating system 410 also includes an image analysis component 415 for using image recognition for identifying information relating to one or more interface elements that are being interacted with in the visual section.

The content creating system 410 may include a verifying component 425 for verifying interface elements in the visual section corresponding to the task action term including an element component 426 for visually analyzing a visual section to identify interface elements shown in the video file and determining an identified interface element corresponding to the task action term. The element component 426 may include visually analyzing a visual section to identify interface elements uses edge detection techniques and may include detecting motion in the interface element and/or recognizing text in the interface element corresponding to the task action term.

The content creating system 410 may include a disambiguating component 427 for substituting ambiguous task action terms from the transcript with terms derived from analysis of the visual section.

The content creating system 410 may include a document generating component 416 for generating a task instruction document including the task action terms augmented with interface element information and with at least a portion of the captured visual section. The document generating component 416 may include retrieving and displaying an image or clip of the visual section. The generating component 416 generates a task instruction document combines written instructions and images in a structured topic-oriented format to share the information.

Figure 5:
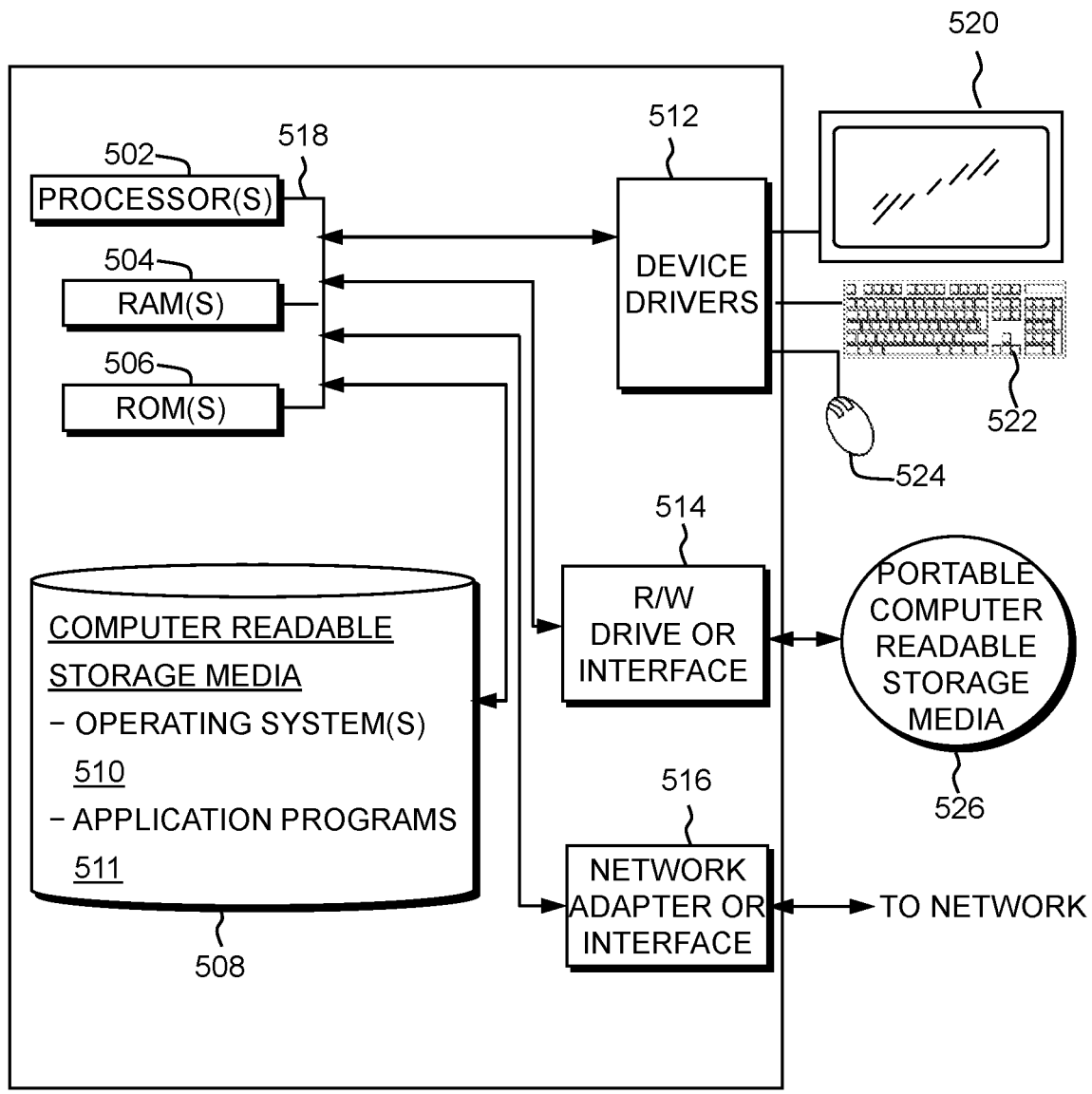
FIG. 5 is a block diagram of an embodiment of a computer system or cloud server in which embodiments of the present invention may be implemented.

FIG. 5 depicts a block diagram of components of a computing system as used for the computing system 400, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

The computing system can include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications, and network processors, etc.), system memory, peripheral devices, and any other hardware components within the system.

One or more operating systems 510, and application programs 511, are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 514 to read from and write to one or more portable computer readable storage media 526. Application programs 511 on the computing system can be stored on one or more of the portable computer readable storage media 526, read via the respective R/W drive or interface 514 and loaded into the respective computer readable storage media 508.

The computing system can also include a network adapter or interface 516, such as a TCP/IP adapter card or wireless communication adapter. Application programs 511 on the computing system can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

The computing system can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514, and network adapter or interface 516 can comprise hardware and software stored in computer readable storage media 508 and/or ROM 506.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
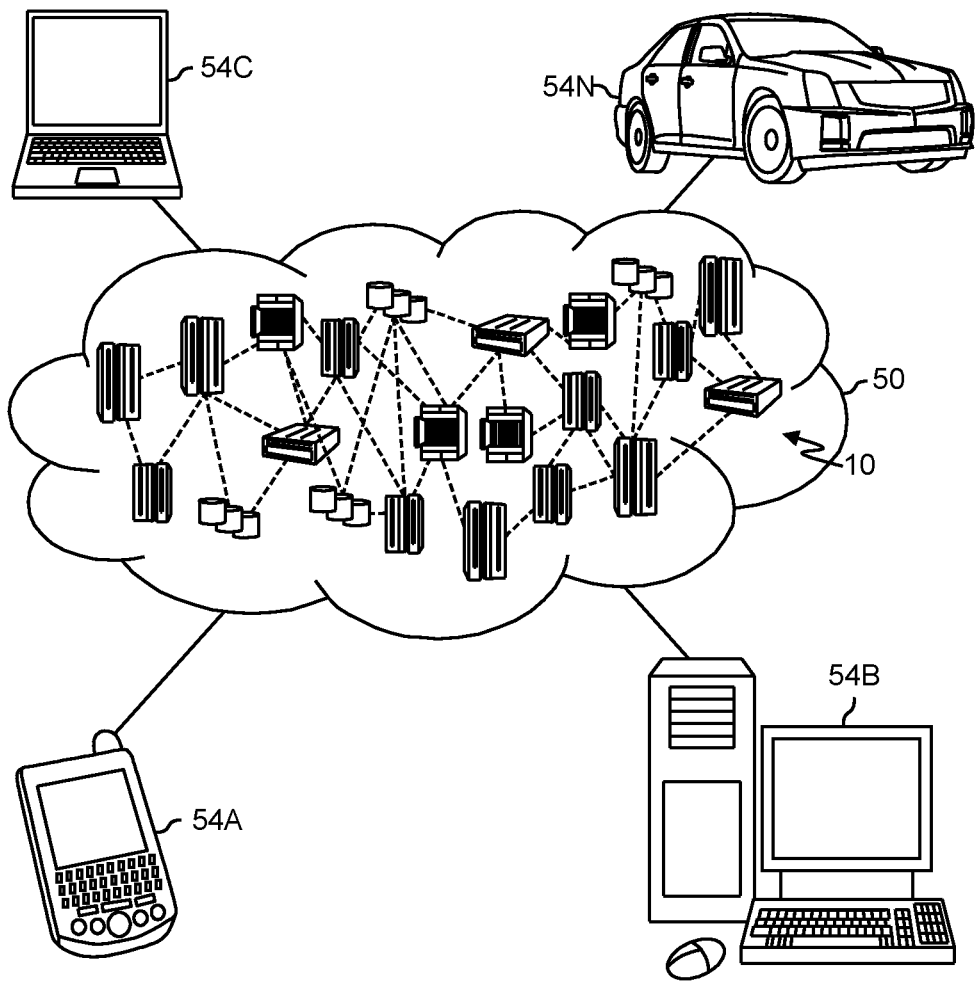
FIG. 6 is a schematic diagram of a cloud computing environment in which embodiments of the present invention may be implemented.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
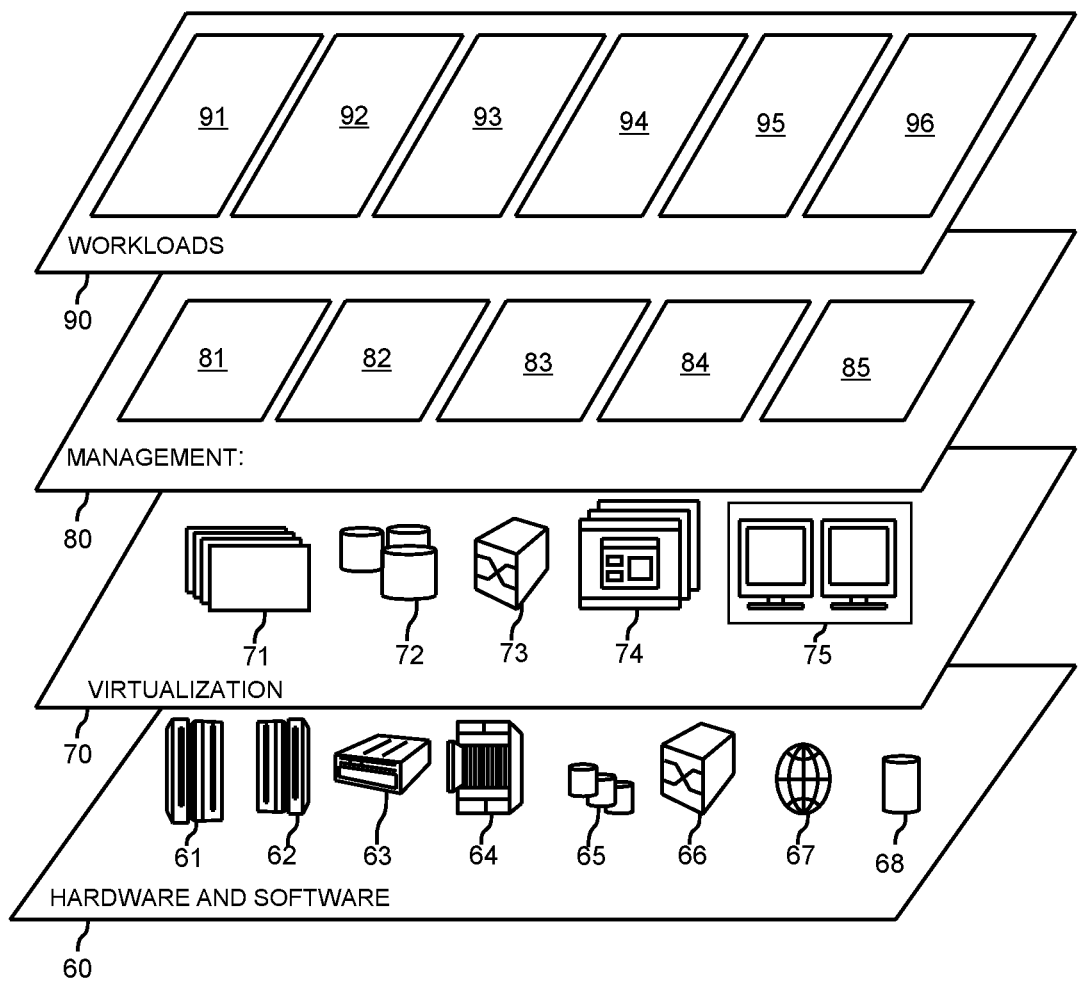
FIG. 7 is a diagram of abstraction model layers of a cloud computing environment in which embodiments of the present invention may be implemented.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for automatically creating task content, said method carried out by one or more processors of a computer system and comprising:
    receiving a video file with an associated transcript of audio associated with the video file;
    identifying task action terms in the transcript;
    for each task action term:
        locating a visual section of the video file corresponding to the task action term;
        capturing at least a portion of the visual section of the video file; and
        using image recognition for identifying information relating to one or more interface elements that are being interacted with in the visual section; and
    generating a task instruction document including the task action terms augmented with interface element information and with at least a portion of the captured visual section.

2. The method of claim 1, wherein locating the visual section comprises:
    determining a timestamp of the identified task action term in the video file; and
    locating the visual section of the video file corresponding to the timestamp, wherein the timestamp is a time instance or a time range.

3. The method of claim 1, wherein locating the visual section comprises:
    visually analyzing the video file to identify visual elements matching the task action terms.

4. The method of claim 1, wherein capturing the visual sections comprises:
    storing the visual section from the video file in a repository;
    providing a link in the transcript to the visual section in the repository; and
    wherein generating a task instruction document comprises retrieving and displaying an image or clip of the visual section.

5. The method of claim 1, further comprising verifying interface elements in the visual section corresponding to the task action term by:
    visually analyzing the visual section to identify interface elements shown in the video file;
    determining an identified interface element corresponding to the task action term; and
    wherein capturing at least a portion of the visual section captures the identified interface element.

6. The method of claim 5, wherein visually analyzing the visual section to identify interface elements uses edge detection techniques.

7. The method of claim 5, wherein determining the interface element corresponding to the task action term comprises:
    detecting motion in the interface element.

8. The method of claim 5, wherein determining the interface element corresponding to the task action term comprises:
    recognizing text in the interface element corresponding to the task action term.

9. The method of claim 1, wherein generating the task instruction document comprises:
    substituting ambiguous task action terms from the transcript with terms derived from analysis of the visual section.

10. The method of claim 1, wherein the task instruction document combines written instructions and images in a structured topic-oriented format to share the information.

11. A system for automatically creating task content, comprising:
    a processor and a memory configured to provide computer program instructions to the processor to execute the function of the components:
    a receiving component for receiving a video file with an associated transcript of audio associated with the video file;
    a task term component for identifying task action terms in the transcript;
    for each task action term:
        a visual section component for locating a visual section of the video file corresponding to the task action term;
        a capturing component for capturing at least a portion of the visual section of the video file; and
        an image analysis component for using image recognition for identifying information relating to one or more interface elements that are being interacted with in the visual section; and
    a document generating component for generating a task instruction document including the task action terms augmented with interface element information and with at least a portion of the captured visual section.

12. The system of claim 11, wherein the visual section component comprises:
a timestamp component for determining a timestamp of the identified task action term in the video file and locating the visual section of the video file corresponding to the timestamp, wherein the timestamp is a time instance or a time range.

13. The system of claim 11, wherein the visual section component comprises:
a visual analysis component for visually analyzing the video file to identify visual elements matching the task action terms.

14. The system of claim 11, wherein the capturing component comprises:
a storing component for storing the visual section from the video file in a repository;
a link component for providing a link in the transcript to the visual section in the repository; and
wherein the document generating component includes retrieving and displaying an image or clip of the visual section.

15. The system of claim 11, further comprising a verifying component for verifying interface elements in the visual section corresponding to the task action term by:
an element component for visually analyzing the visual section to identify interface elements shown in the video file and determining an identified interface element corresponding to the task action term; and
wherein the capturing component captures at least a portion of the visual section captures the identified user interface element.

16. The system of claim 15, wherein the element component comprises:
visually analyzing the visual section to identify interface elements using edge detection techniques.

17. The system of claim 15, wherein the element component comprises:
detecting motion in the interface element and recognizing text in the interface element corresponding to the task action term.

18. The system of claim 11, further comprising:
a disambiguating component for substituting ambiguous task action terms from the transcript with terms derived from analysis of the visual section.

19. The system of claim 11, wherein the generating component generates the task instruction document by combining written instructions and images in a structured topic-oriented format to share the information.

20. A computer program product for automatically creating task content, the computer program product comprising a computer readable storage medium having program instructions embodied therewith, the program instructions executable by a processor to cause the processor to:
receive a video file with an associated transcript of audio associated with the video file;
identify a task action terms in the transcript;
for each task action term:
locate a visual section of the video file corresponding to the task action term;
capture at least a portion of the visual section of the video file; and
use image recognition for identifying information relating to one or more interface elements that are being interacted with in the visual section; and
generate a task instruction document including the task action terms augmented with interface element information and with at least a portion of the captured visual section.

* * * * *